United States Patent
Owen et al.

(10) Patent No.: US 10,114,777 B1
(45) Date of Patent: Oct. 30, 2018

(54) I/O SYNCHRONIZATION FOR HIGH INTEGRITY MULTICORE PROCESSING

(71) Applicant: Rockwell Collins, Inc., Cedar Rapids, IA (US)

(72) Inventors: Jason R. Owen, Marion, IA (US); Matthew P. Corbett, Mount Vernon, IA (US); Nicholas H. Bloom, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/617,212

(22) Filed: Jun. 8, 2017

(51) Int. Cl.
| | |
|---|---|
| *G06F 11/16* | (2006.01) |
| *G06F 13/362* | (2006.01) |
| *G06F 9/455* | (2018.01) |
| *G06F 9/54* | (2006.01) |
| *G06F 3/06* | (2006.01) |
| *G06F 17/30* | (2006.01) |
| *G06F 11/14* | (2006.01) |

(52) U.S. Cl.
CPC .......... *G06F 13/3625* (2013.01); *G06F 3/065* (2013.01); *G06F 3/067* (2013.01); *G06F 3/0619* (2013.01); *G06F 9/45558* (2013.01); *G06F 9/546* (2013.01); *G06F 11/1604* (2013.01); *G06F 17/30581* (2013.01); *G06F 11/14* (2013.01); *G06F 11/1484* (2013.01); *G06F 11/16* (2013.01); *G06F 11/1658* (2013.01); *G06F 2009/45579* (2013.01)

(58) Field of Classification Search
CPC ............. G06F 11/1604; G06F 11/1658; G06F 11/1484; G06F 11/16; G06F 11/14; G06F 11/18; G06F 11/182
See application file for complete search history.

(56) References Cited

FOREIGN PATENT DOCUMENTS

EP     2884392     *  6/2015  ............. G06F 11/14

\* cited by examiner

*Primary Examiner* — Ernest Unelus
(74) *Attorney, Agent, or Firm* — Angel N. Gerdzhikov; Donna P. Suchy; Daniel M. Barbieri (57) ABSTRACT

A system and related method for I/O synchronization in a high integrity multi-core processing environment (MCPE) incorporates logical computing units (LCU) of two or more homogeneous processing cores, each core running a guest operating system (GOS) and user applications such that the homogeneous cores concurrently generate the same output data (which the GOS loads to an I/O synchronization engine (IOSE)) or receive the same output data from the IOSE. The IOSE verifies data integrity by comparing the concurrently received datasets and selects a verified dataset for routing to other cores or externally to the MCPE. The IOSE receives and atomically replicates input data for synchronous transfer to, and consumption by, the user applications running on the cores of the LCU.

20 Claims, 4 Drawing Sheets

212 — Receiving, via the IOSE, at least one input dataset from the at least one of the second processing core and the network 214 — Generating, via the IOSE, at least one synchronous input by atomically replicating the at least one input dataset into two or more second IOS channels corresponding to the two or more homogeneous GOS 216 — Concurrently transferring, via the two or more second IOS channels, the at least one synchronous input to the two or more GOS

*FIG. 3B*

I/O SYNCHRONIZATION FOR HIGH INTEGRITY MULTICORE PROCESSING

BACKGROUND

A classical architectural approach to application-transparent high integrity computing uses two discrete host processors executing the same software simultaneously in a lockstep fashion. This cycle-lockstep approach to processor synchronization requires access to the processing cores' internal busses. An independent checking function interfaces with each processor's front-side bus in order to provide control and monitoring of each processor's transactions to main memory and peripherals. A processing error is indicated by divergent bus transactions generated by the processing cores. This method requires that the inputs and outputs for each processing channel remain completely synchronized at a granular instruction level. Asynchronous events must be synchronized to the processing cores by custom logic and some performance features of the processing cores may need to be disabled in order to maintain cycle accuracy of the processing cores over long periods of execution.

Modern processor architectures have greatly changed since the mid 2000's with the adoption of more integrated System on a Chip (SoC) designs. Due to this high level of integration of multiple processing cores, accelerators, and peripherals, the creation of high-integrity architecture is no longer as straightforward. The synchronization of asynchronous hardware events within multi-core SoCs (e.g., internal clock domain crossings, divergent branch predictions or and Translation Lookaside Buffer (TLB)/cache states, multi-core or SoC interference channel latency jitter, out-of-order and speculative instruction execution, or unexpected machine state interrupts) presents additional challenges. SoCs and processing cores continue to advance by adopting performance-driven architectures that are not designed with determinism as a goal, making the task of granular lock-stepping with these devices increasingly difficult. Modern processing architectures therefore do not support instruction-level lockstep unless designed in by the silicon manufacturer. General-purpose processor elements with commercial off-the-shelf (COTS) SoC devices do not support high-integrity operation without custom hardware or software. In order to continue to leverage COTS devices for high integrity general purpose processing, system designers will need to adopt new processing architectures and approaches that leverage the capabilities of the current multicore SoC devices in order to achieve the same level of synchronization.

SUMMARY

In one aspect, embodiments of the inventive concepts disclosed herein are directed to a system for input/output (I/O) synchronization in a high-integrity multicore processing environment (MCPE). The MCPE includes logical processing units (LPU) including two or more homogeneous processing cores, each core concurrently running the same guest operating system (GOS) and user applications. Each GOS, concurrently with the other GOS, forwards externally received input data to its user applications and receives queued output data from its user applications. The system includes an I/O synchronization (IOS) engine (IOSE) connected to the LPU, which concurrently receives the output data as each GOS loads its corresponding output datasets into a transmit IOS channel (IOSC). The IOSE verifies the integrity of the received output data by comparing each of the two or more output datasets concurrently received from each GOS and, upon a successful verification, selects final output data from the verified output datasets. The IOSE routes the final output data to other cores of the MCPE or to external sources such as a network connected to the MCPE. The IOSE receives the input data from the external sources or other cores and generates a synchronous input for the LPU by atomically replicating the input data into a receiving IOSC for each GOS, concurrently transferring the synchronous input to the LPU via each GOS. The system includes a hypervisor for synchronizing the concurrent receipt of the output data by each GOS from its corresponding user applications.

In a further aspect, embodiments of the inventive concepts disclosed herein are directed to a system-on-a-chip (SoC) device such as a field-programmable gate array (FPGA) or application-specific integrated circuit (ASIC). The SoC includes logical processing units (LPU) comprising two or more homogeneous processing cores, each core concurrently running the same guest operating system (GOS) and user applications. Each GOS, concurrently with the other GOS, forwards externally received input data to its user applications and receives queued output data from its user applications. The SoC device includes an IOSE connected to the LPU, which concurrently receives the output data as each GOS loads its corresponding output dataset into a transmit IOSC. The IOSE verifies the integrity of the received output data by comparing each of the two or more output datasets concurrently received from each GOS and, upon a successful verification, selects final output data from the verified output datasets. The IOSE routes the final output data to other cores of the MCPE or to external sources such as a network connected to the MCPE. The IOSE receives the input data from the external sources or other cores and generates a synchronous input for the LPU by atomically replicating the input data into a receiving IOSC for each GOS, concurrently transferring the synchronous input to the LPU via each GOS. The SoC device includes a hypervisor for synchronizing the concurrent receipt of the output data by each GOS from its corresponding user applications.

In a still further aspect, embodiments of the inventive concepts disclosed herein are directed to a method for I/O synchronization in a high-integrity multi-core processing environment (MCPE). The method includes concurrently receiving, via two or more guest operating systems (GOS), each GOS executing on a homogeneous processing core of a logical processing unit (LPU), output data from corresponding user applications executing on each homogeneous processing core. The method includes concurrently receiving, via an IOSE, a synchronous output comprising the concurrently received output data. The method includes loading, via the IOSE, each of the two or more concurrently received output datasets into a discrete transmit IOSC. The method includes verifying, via the IOSE, the integrity of the synchronous output by comparing the two or more concurrently received output datasets. The method includes, on a successful verification, selecting one of the two or more verified output datasets as final output data via the IOSE. The method includes routing, via the IOSE, the final output data to heterogeneous processing cores of the MCPE, other external cores, or networks connected to the MCPE.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for I/O synchronization in a multi-core processing environment (MCPE), whether in an avionics-based environment or aboard a ground-based or water-based vehicle where high-integrity processing may be desirable. Embodiments of the inventive concepts disclosed herein provide a means for high integrity (e.g., 1E-10) computing for critical avionics applications while leveraging the benefits of commercial off the shelf (COTS) components. Furthermore, the functionality and reliability of a high-integrity computing system may be increased at reduced cost by implementing the system on a single silicon device, without the need for multiple, separate physical computation channels. The proposed solution moves integrity checking from synchronized instruction-level access to the I/O boundaries of the system. For example, instead of checking for matching granular bus transactions, the proposed solution checks the coarse output products of the functions. This approach may work well in systems with a limited number of deterministic I/O interfaces, where the I/O flow may be easily controlled.

Figure 1:
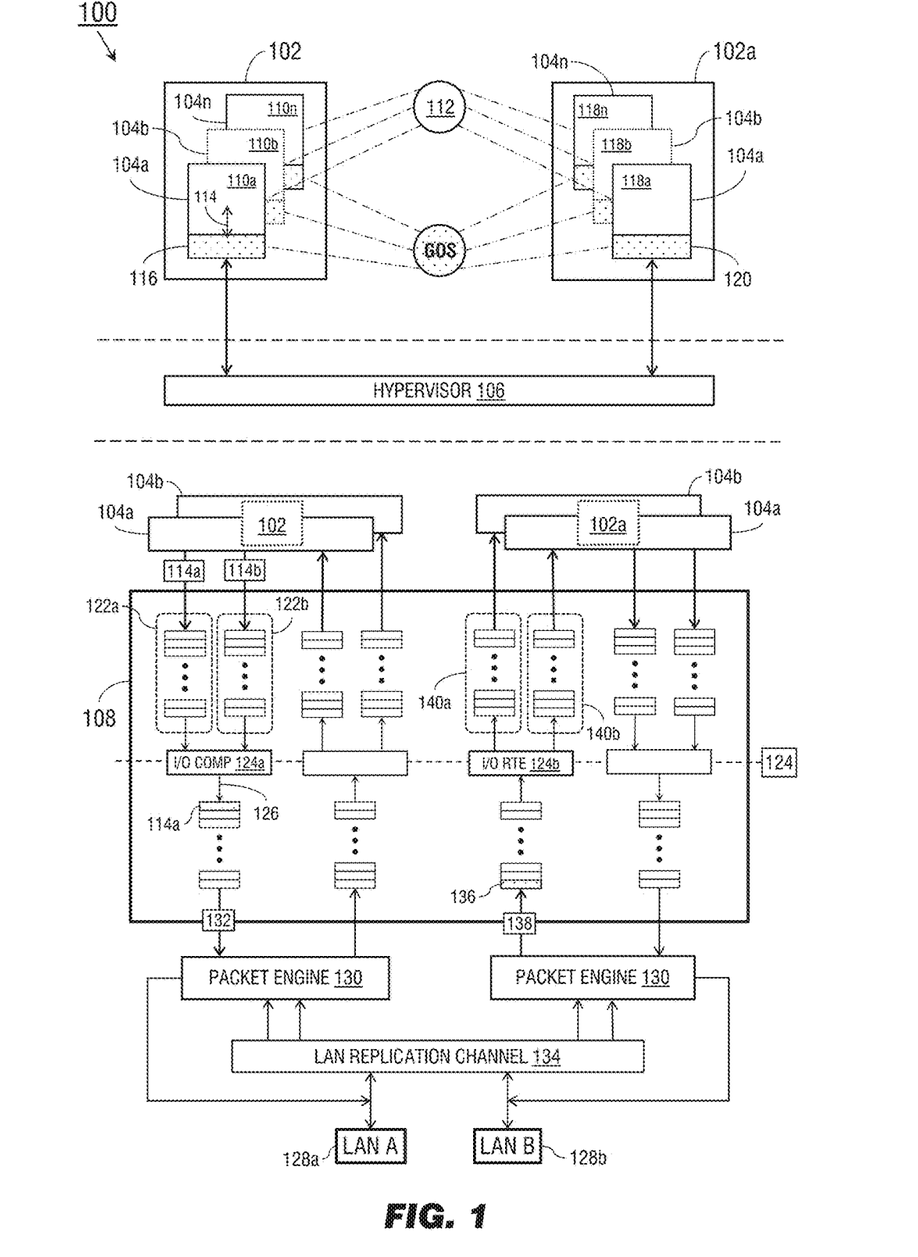
FIG. 1 illustrates an exemplary embodiment of a system for I/O synchronization in a multi-core processing environment (MCPE) according to the inventive concepts disclosed herein.

Referring to FIG. 1, an exemplary embodiment of a system 100 for I/O synchronization in a multi-core processing environment (MCPE) according to the inventive concepts disclosed herein may include a logical processing unit 102 (LPU; also logical computing unit (LCU)) comprising two or more homogeneous processing cores (104a-n) (e.g., physical processing cores or logical partitions of a physical processing core), a hypervisor 106 at the MCPE or platform level, and a high integrity (e.g., 1E-10) I/O synchronization engine (IOSE) 108. In some embodiments, the system 100 may be embodied on a single silicon device or system on a chip (SoC), such as a field programmable gate away (FPGA), application specific integrated circuit (ASIC) or reduced instruction set computing (RISC) processor. The LPU 102 may be a grouping of homogeneous processing cores 104a-n leveraged to provide high integrity computational capacity for critical applications. Each homogeneous processing core 104a-n may include the same user applications 110a-n executing thereon according to the same scheduling (112). For example, each user application 110a-n may generate the same sequential output data (114), providing multiple copies of an output dataset (e.g., a result based on received input data) for comparison by the IOSE 108. However, the execution of the user applications 110a-n may not be in low-level granular lockstep; scheduling synchronization between the user applications 110a-n concurrently executing on each homogeneous processing core 104a-n may be provided at the platform level (e.g., via the hypervisor 106) to ensure that the user applications are hardware-independent and executable via any custom off the shelf (COTS) device. In conjunction with the hypervisor 106, each homogeneous processing core 104a-n may include a custom guest operating system 116 (GOS) executing thereon. Each GOS 116 may be a real-time OS executing concurrently with the other GOS on the other homogeneous processing cores 104a-n of the LPU 102. Each GOS 116 may further ensure the ordinal integrity of any sequential (e.g., queued) output data 114 concurrently generated by the user applications 110*a-n*. Any jitter between the homogeneous GOS (116) of the LPU 102 may be monitored, and corrected, by the hypervisor 106. For example, should the GOS 116 executing on the homogeneous processing core 104*a* complete its major frame ahead of schedule with respect to the other homogeneous processing cores 104*b-n* of the LPU 102, the hypervisor 106 may delay the start of the next major frame to allow the trailing GOS 116 (executing on the processing cores 104*b-n*) to catch up. In this way, the hypervisor 106 may ensure that any time disparity between concurrently executing GOS 116 remains within predictable bounds. Should the time disparity reach unacceptable levels, the hypervisor 106 may resynchronize the concurrent execution on homogeneous processing cores 104*a-n* by resetting the LPU 102. A single MCPE and system 100 may support multiple LPUs; for example, in addition to the LPU 102, an additional LPU 102*a* may be instantiated on the homogeneous processing cores 104*a-n* (e.g., on different partitions of the homogeneous processing cores 104*a-n* than the LPU 102). The additional LPU 102*a* may include an additional set of concurrently executing, homogeneous user applications (118*a-n*) and an additional GOS (120) concurrently executing on each homogeneous processing core 104*a-n*.

Control and synchronization of synchronous output from the LPU 102, as well as synchronous input into the LPU (e.g., the input data concurrently processed by each user application 110*a-n*) may be provided by the IOSE 108, which ensures that each user application 110*a-n* receives synchronized and identical input and verifies the integrity of LPU output data. For example, the GOS 116 executing on each homogeneous processing core 104*a-b* may concurrently receive output data (114) from its corresponding user applications (110*a-n*) and load each individual output dataset (114*a*-b) into a discrete transmit I/O synchronization (IOS) channel 122*a-b*. Each homogeneous processing core 104*a-b* may individually write into its respective transmit IOS channel 122*a-b* (via the GOS 116) as a function of the rate at which the output data 114 is generated from the corresponding user applications (110*a-n*) executing on the particular homogeneous processing core, with the ordinal integrity of the output data 114 maintained by the GOS 116 (e.g., the GOS may ensure that output data 114*a-b* generated sequentially (dataset A, dataset B, . . . dataset N) and written into the transmit IOS channels 122*a-b* in the same order as generated).

When the LPU 102 reaches a synchronization point (124), the IOS channel 122*a-b* may initiate integrity verification by comparison (124*a*) of the received output datasets 114*a-b* in each IOSC 122*a-b*. The integrity verification may be triggered by the last, or latest, arriving output dataset (114*b*). For example, when the first output dataset (114*a*) arrives, the IOSE 108 may open a configurable check window during which all output datasets 114*a-b* must arrive, e.g., by triggering a countdown timer. If the final output dataset (114*b*) has not arrived when the check window closes (e.g., when the countdown timer expires or reaches a predetermined threshold), the IOSE 108 may return an unsuccessful verification, e.g., a mismatch. Alternatively, when the final output dataset (114*b*) arrives, the IOSE may compare all received output datasets 114*a-b*; for example, a successful verification may be achieved when all output datasets 114*a-b* are verified by the IOSE to be identical. The synchronization point (124) at which the check window closes may be determined, e.g., by the slowest homogeneous processing core 104*a-n* or network hardware component. On a successful verification, the IOSE 108 may route the verified data by selecting one output dataset (114*a*) and discarding the remaining output datasets (114*b*). The selected output dataset (114*a*) may be routed (126) to other processing cores of the MCPE or external to the system 100. For example, the output dataset 114*a* may be routed (126) to a local area network (LAN) 128*a* external to the system 100 via a packet engine (130; e.g., an 802.3, ARINC 664 pt. 7, or similar network interface); if the output dataset 114*a* requires replication for consumption by the packet engine 130 or by an external LPU, the output dataset may be atomically replicated by the IOSE 108 or by a packet engine transmit channel (PETC) 132.

The system 100 may process network traffic via a dual-channel architecture, transmitting output to and receiving input from multiple LANs 128*a-b*. For example, the system 100 may include a LAN replication channel 134 (replication stage) for replicating input data received from LANs 128*a-b*, such that input data (136) from both LANs is available to both LPUs 102, 102*a* via a packet engine receiving channel 138 (PERC). Based on routing rules, the IOSE 108 may atomically replicate and route (124*b*) the input data 136 into receiving IOSC (140*a-b*) for concurrent reception and consumption by the user applications 118*a-n* executing on the homogeneous processing cores 104*a-n* of the LPU 102*a* (via the homogeneous GOS 120 executing on each core). The IOSE 108 may perform redundancy management and/or input checking operations on output data (114) or input data (136) arriving at the IOSE from the LPUs 102, 102*a* or from external sources via the LANs 128*a-b*. In addition to the configurable check window as described above, during which all redundant inputs or outputs must arrive, the IOSE 108 may further filter arriving input data 136 and output data 114 to classify those messages, frames, or packets requiring integrity check by the IOSE (as opposed to messages, frames, or packets that require no integrity check) or to identify portions or segments of incoming messages that must be determined to be identical to each other (as opposed to the message as a whole). In addition, the IOSE 108 may statically select and define a particular homogeneous processing core (104*a*) as a master core and the remaining homogeneous processing cores (104*b-n*) as redundant or checker cores. Accordingly, on a successful verification (124*a*), the output dataset 114*a* generated by the master core (104*a*) will always be routed to the PETC 132.

Figure 2:
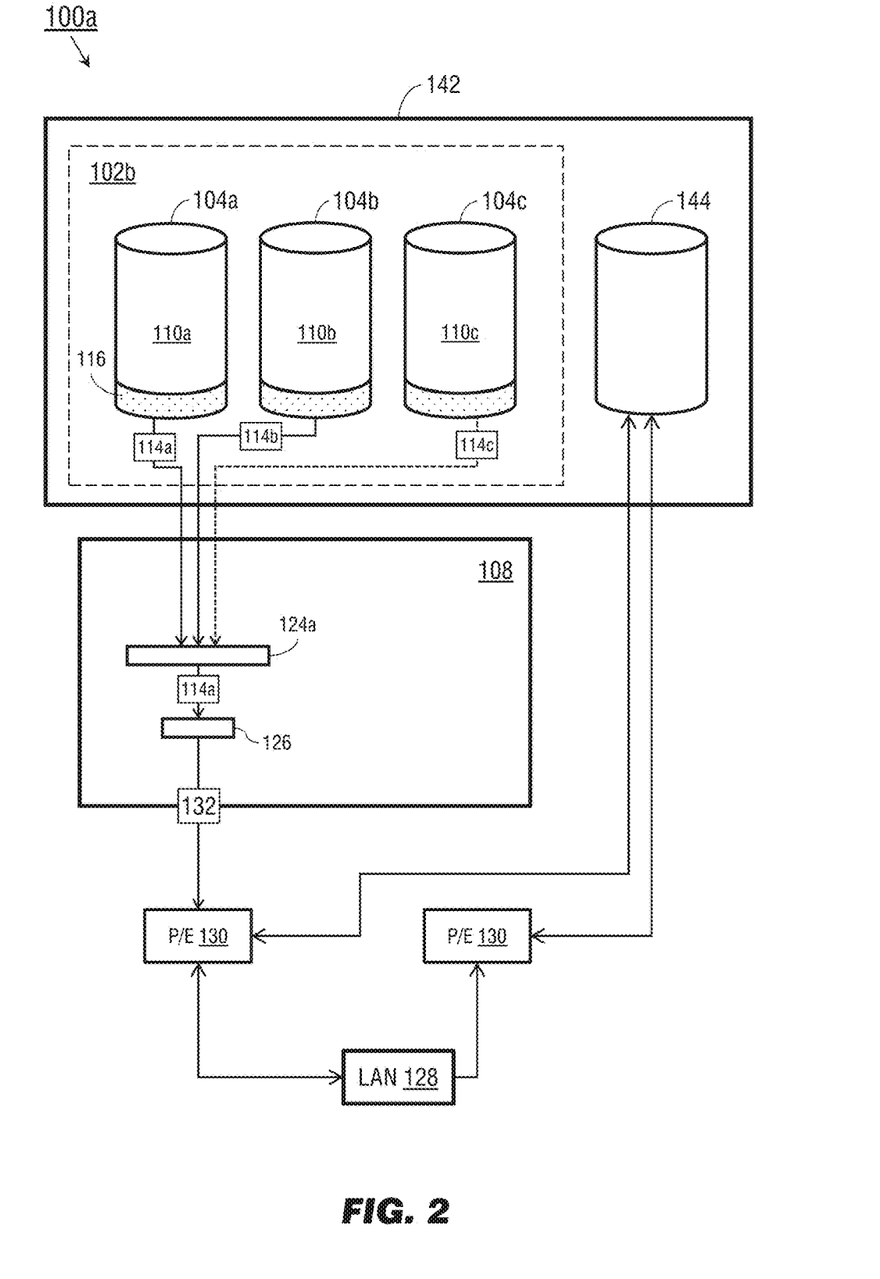
FIG. 2 illustrates an embodiment of the system of FIG. 1.

Referring now to FIG. 2, the system 100*a* may be implemented and may operate similarly to the system 100 of FIG. 1, except that the system 100*a* may incorporate a LPU 102*b* within which user applications 110*a-c* execute on three or more homogeneous processing cores 104*a-c* of a MCPE (142). The LPU 102*b* may incorporate any odd number of homogeneous processing cores 104*a-c* (e.g., 3 cores, 5 cores). The IOSE 108, in addition to verifying the integrity of synchronous output data (114*a-c*) generated by the user applications 110*a-c*, may perform error detection at the comparison stage (124*a*) by identifying an output dataset (114*c*) that differs from the other concurrently received output datasets (114*a-b*). The outlying output dataset 114*c* may be "voted out" by the two concurring (identical) output datasets 114*a-b*, one of which concurring output datasets (114*a*) may be selected for routing (126) to a PETC (132) for transmission externally (e.g., to a LAN 128) or to another processing core (144) via a packet engine 130. The destination processing core 144 may be, e.g., a heterogeneous processing core or partition, co-located in the MCPE 142 with the homogeneous processing cores 104*a-c* (but on which the same user applications (110*a-c*) or GOS (116) are not configured to execute), or a low-integrity processing core whose inputs and outputs do not require integrity checking. Accordingly, the destination processing core 144 may be located in the MCPE 142 yet not connected to the IOSE 108.

Figure 3A:
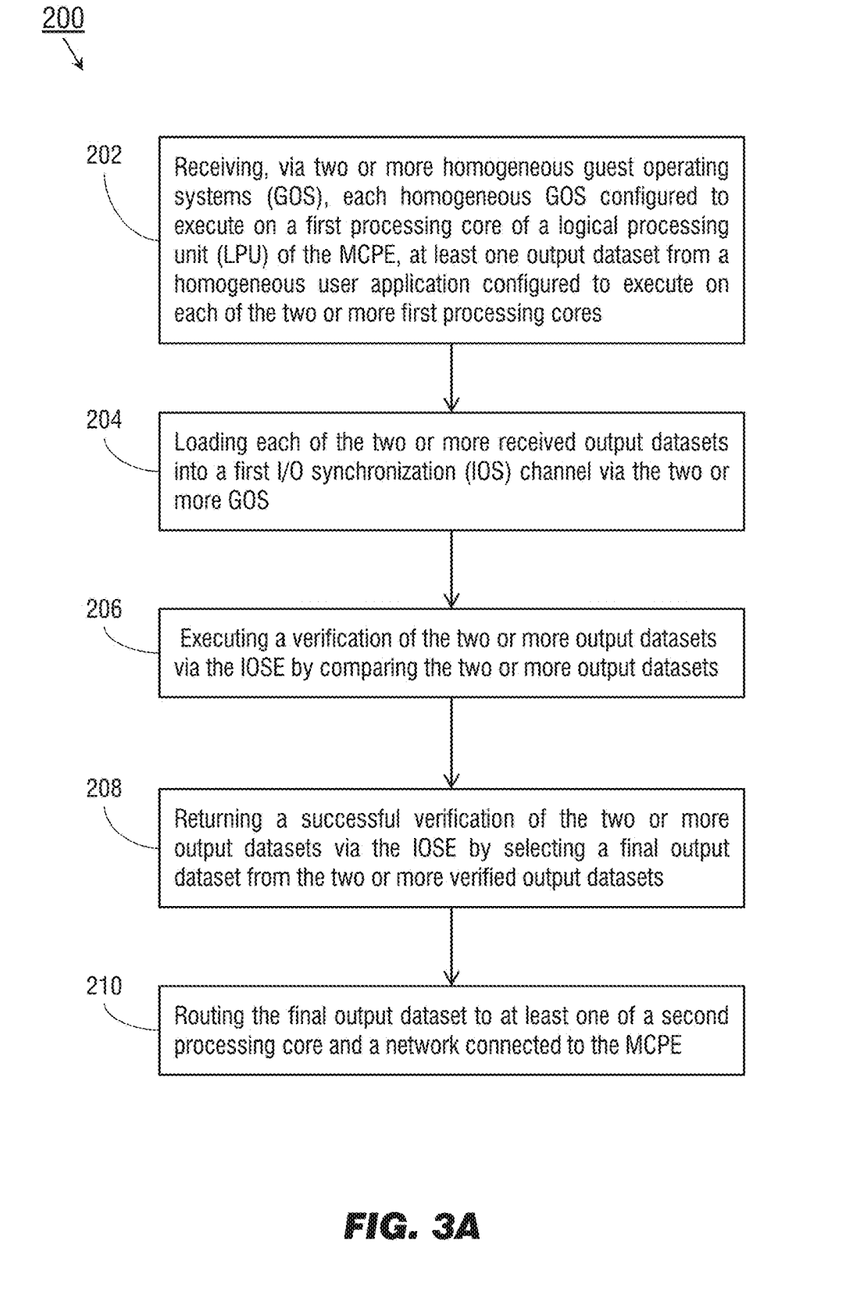
FIGS. 3A and 3B illustrate an exemplary embodiment of a method for I/O synchronization in a MCPE according to the inventive concepts disclosed herein.
Figure 3B:
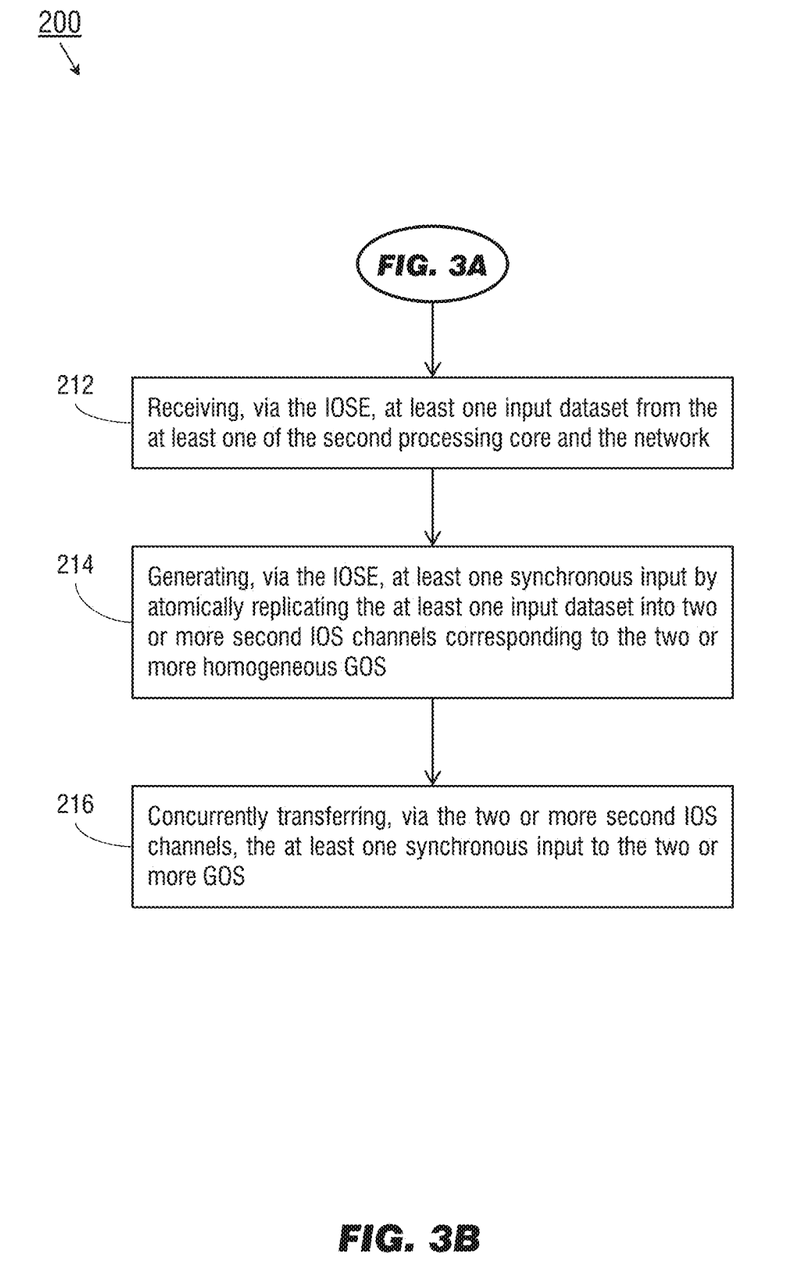

Referring now to FIGS. 3A and 3B, an exemplary embodiment of a method 200 for I/O synchronization in a MCPE according to the inventive concepts disclosed herein may be implemented by the system 100 in some embodiments, and may include one or more of the following steps. Referring particularly to FIG. 3A, at a step 202, each of the two or more homogeneous GOS, each GOS executing on a homogeneous processing core of a logical processing unit (LPU), concurrently receives an output dataset generated by a homogeneous user application executing on the processing core.

At a step 204, each GOS concurrently loads its received output dataset to a transmit I/O synchronization (IOS) channel of the I/O synchronization engine (IOSE). For example, when the first output dataset arrives, the IOSE may open a configurable check window within which all output datasets must arrive (e.g., before a countdown timer expires).

At a step 206, the IOSE verifies the integrity of the two or more output datasets in the transmit IOS channels by comparing each output dataset. The verification, or comparison, may take place when the configurable check window closes, e.g., the countdown timer expires; if all output datasets have not been received when the check window closes, an unsuccessful verification may result.

At a step 208, the IOSE returns a successful verification of the two or more output datasets by selecting a final verified output dataset for routing. For example, a verification may be successful if the two or more output datasets are determined to be identical. If the LPU includes three or more homogeneous processing cores, a successful verification may result if an outlying output dataset is identified and "voted out" by two or more identical datasets, one of which may be routed externally.

At a step 210, the IOSE routes the selected final output dataset to an external source such as an external processing core or a network connected to the MCPE. For example, the IOSE may route final output data selected from one of a group of homogeneous processing cores of the LPU to a heterogeneous processing core of the MCPE that is not otherwise part of the LPU or connected to the IOSE.

Referring now to FIG. 3B, the method 200 may include additional steps 212 through 216. At the step 212, the IOSE receives an input dataset from the external source (e.g., the external processing core or the network).

At a step 214, the IOSE generates a synchronous input for the user applications concurrently executing on the homogeneous processing cores of the LPU by atomically replicating the received input dataset into two or more receipt IOS channels corresponding to the two or more homogeneous GOS, each GOS executing on a processing core of the LPU.

At the step 216, the IOSE concurrently transfers the replicated input datasets of the synchronous input to the two or more homogeneous GOS for consumption by the user applications executing on the homogeneous processing cores of the LPU.

As will be appreciated from the above, systems and methods according to embodiments of the inventive concepts disclosed herein may enable the implementation of high-integrity avionics processing via a single silicon device, improving the reliability and mean time between failures (MTBF) of such a system while simplifying hardware requirements and reducing costs.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for input/output (I/O) synchronization in a high-integrity multicore processing environment (MCPE), comprising:

at least one logical processing unit (LPU) comprising a plurality of homogeneous processing cores, each homogeneous processing core associated with at least one of a guest operating system (GOS) and a user application configured to execute on the homogeneous processing core, each GOS configured to concurrently:
forward at least one input dataset to the at least one user application;
receive at least one output dataset from the at least one user application; and
load the received output dataset into an output I/O synchronization (IOS) channel;

at least one I/O synchronization engine (IOSE) connected to the at least one LPU and comprising the at least one output IOS channel and at least one input IOS channel, the IOSE configured to:
execute at least one verification of the at least one loaded output dataset;
return at least one successful verification by selecting a final output dataset from the at least one loaded output dataset;
route the final output dataset to at least one of an external processing core and a network connected to the MCPE;
receive the at least one input dataset from the at least one of the external processing core and the network;
generate at least one synchronous input by atomically replicating the at least one input dataset into the at least one input IOS channel;
and
concurrently transfer the at least one synchronous input to the at least one GOS via the at least one input IOS channel;

and
at least one hypervisor coupled to the at least one LPU and configured to synchronize the receipt of the at least one output dataset by the at least one GOS.

2. The system for I/O synchronization of claim 1, wherein:

the at least one user application is configured to generate at least one queued sequence of the output datasets; and the at least one GOS is configured to monitor the ordinality of the at least one queued sequence.

3. The system for I/O synchronization of claim 1, wherein:

the at least one LPU comprises an odd number of at least three homogeneous processing cores, each of the homogenous processing cores associated with an output dataset; and the IOSE is configured to return the successful verification by at least one of:

determining that the associated output datasets are identical; and where the associated output datasets comprise at least one of an identical output dataset and a divergent output dataset, 1) identifying the divergent output dataset and 2) selecting the final output dataset from the identical output datasets.

4. The system for I/O synchronization of claim 1, wherein the at least one IOSE is configured to:

trigger a countdown timer upon the loading of a first output dataset of the at least one output dataset to the at least one output IOS channel;

execute the verification when the countdown timer expires; and return an unsuccessful verification if either a) the at least one output dataset is not identical or b) each of the at least one output dataset has not been loaded to the at least one output IOS channel when the countdown timer expires.

5. The system for I/O synchronization of claim 1, wherein the at least one hypervisor is configured to reset the at least one LPU.

6. The system for I/O synchronization of claim 1, wherein the MCPE further comprises:

at least one heterogeneous processing core connected to the network, the at least one heterogeneous processing core not connected to the at least one IOSE.

7. A system on a chip (SoC) device, comprising:

at least one logical processing unit (LPU) comprising a plurality of homogeneous processing cores, each homogeneous processing core associated with at least one of a guest operating system (GOS) and a user application configured to execute on the homogeneous processing core, each GOS configured to concurrently:

forward at least one input dataset to the at least one user application;

receive at least one output dataset from the at least one user application; and load the received output dataset into an output I/O synchronization (IOS) channel;

at least one I/O synchronization engine (IOSE) connected to the at least one LPU and comprising the at least one output IOS channel and at least one input IOS channel, the IOSE configured to:

execute at least one verification of the at least one loaded output dataset;

return at least one successful verification by selecting a final output dataset from the at least one loaded output dataset;

route the final output dataset to at least one of an external processing core and a network connected to the MCPE;

receive the at least one input dataset from the at least one of the external processing core and the network;

generate at least one synchronous input by atomically replicating the at least one input dataset into the at least one input IOS channel; and concurrently transfer the at least one synchronous input to the at least one GOS via the at least one input IOS channel; and at least one hypervisor coupled to the at least one LPU and configured to synchronize the receipt of the at least one output dataset by the at least one GOS.

8. The SoC device of claim 7, wherein:

the at least one LPU comprises an odd number of at least three homogeneous processing cores, each of the homogenous processing cores associated with an output dataset; and the IOSE is configured to return the successful verification of the at least one synchronous output by at least one of:

determining that the associated output datasets are identical; and where the associated output datasets comprise at least one of an identical output dataset and a divergent output dataset, 1) identifying the divergent output dataset and 2) selecting the final output dataset from the identical output datasets.

9. The SoC device of claim 7, wherein the at least one IOSE is configured to:

trigger a countdown timer upon the loading of a first output dataset of the at least one output dataset to the at least one output IOS channel;

execute the verification when the countdown timer expires; and return an unsuccessful verification if either a) the at least one output dataset is not identical or b) each of the at least one output dataset has not been loaded to the at least one output IOS channel when the countdown timer expires.

10. The SoC device of claim 7, wherein the at least one hypervisor is configured to reset the at least one LPU.

11. The SoC device of claim 7, wherein the MCPE further comprises:

at least one heterogeneous processing core connected to the network, the at least one heterogeneous processing core not connected to the at least one IOSE.

12. The SoC device of claim 7, wherein the SoC device includes at least one of a field programmable gate array (FPGA), an application specific integrated circuit (ASIC), and a reduced instruction set computer (RISC) processor.

13. A method for I/O synchronization in a high-integrity multi-core processing environment (MCPE), the method comprising:

concurrently receiving, via at least one homogeneous guest operating systems (GOS), each GOS configured to execute on a first processing core of a logical processing unit (LPU) of the MCPE, at least one output dataset from a homogeneous user application configured to execute on each of the first processing cores;

synchronizing the receipt of the at least one output dataset by the at least one GOS via a hypervisor of the MCPE;

loading the at least one received output dataset into an output I/O synchronization (IOS) channel via the at least one GOS;

executing a verification of the at least one output dataset via an I/O synchronization engine (IOSE) by comparing the at least one output dataset;

returning a successful verification of the at least one output dataset via the IOSE by selecting a final output dataset from the at least one output dataset; and routing the final output dataset to at least one of a second processing core and a network connected to the MCPE via the IOSE.

14. The method of claim 13, wherein returning a successful verification of the at least one output dataset via the IOSE by selecting a final output dataset from the at least one output dataset includes:

returning the successful verification by determining that the at least one output dataset is identical.

15. The method of claim 13, wherein loading the at least one received output dataset into an output I/O synchronization (IOS) channel via the at least one GOS includes:

triggering, via the IOSE, a countdown timer upon the loading of a first output dataset of the at least one output dataset.

16. The method of claim 15, wherein executing a verification of the at least one output dataset via an I/O synchronization engine (IOSE) by comparing the at least one output dataset includes:

executing the verification by comparing the at least one output dataset when the countdown timer reaches the expiration threshold.

17. The method of claim 15, wherein executing a verification of the at least one output dataset via an I/O synchronization engine (IOSE) by comparing the at least one output dataset includes:

returning an unsuccessful verification if each of the at least one output dataset has not been loaded to the at least one output IOS channel when the countdown timer expires.

18. The method of claim 13, wherein the LPU includes at least three first processing cores, and returning a successful verification of the at least one output dataset via the IOSE by selecting a final output dataset from the at least one output dataset includes:

where the at least three output datasets comprise at least one of an identical output dataset and a divergent output dataset, 1) identifying the divergent output dataset and 2) selecting the final output dataset from the at least one identical output dataset.

19. The method of claim 13, wherein the first processing core is a homogeneous processing core, and routing the final output dataset to at least one of a second processing core and a network connected to the MCPE via the IOSE includes:

routing the final output dataset to at least one heterogeneous processing core of the MCPE via the IOSE.

20. The method of claim 13, further comprising:

receiving, via the IOSE, at least one input dataset from the at least one of the second processing core and the network;

generating, via the IOSE, at least one synchronous input by atomically replicating the at least one input dataset into at least one input IOS channel; and concurrently transferring, via the at least one input IOS channel, the at least one synchronous input to the at least one GOS.

* * * * *